L. F. Cavanaugh,
Stump Elevator.
N° 2,094.    Patented May 15, 1841.
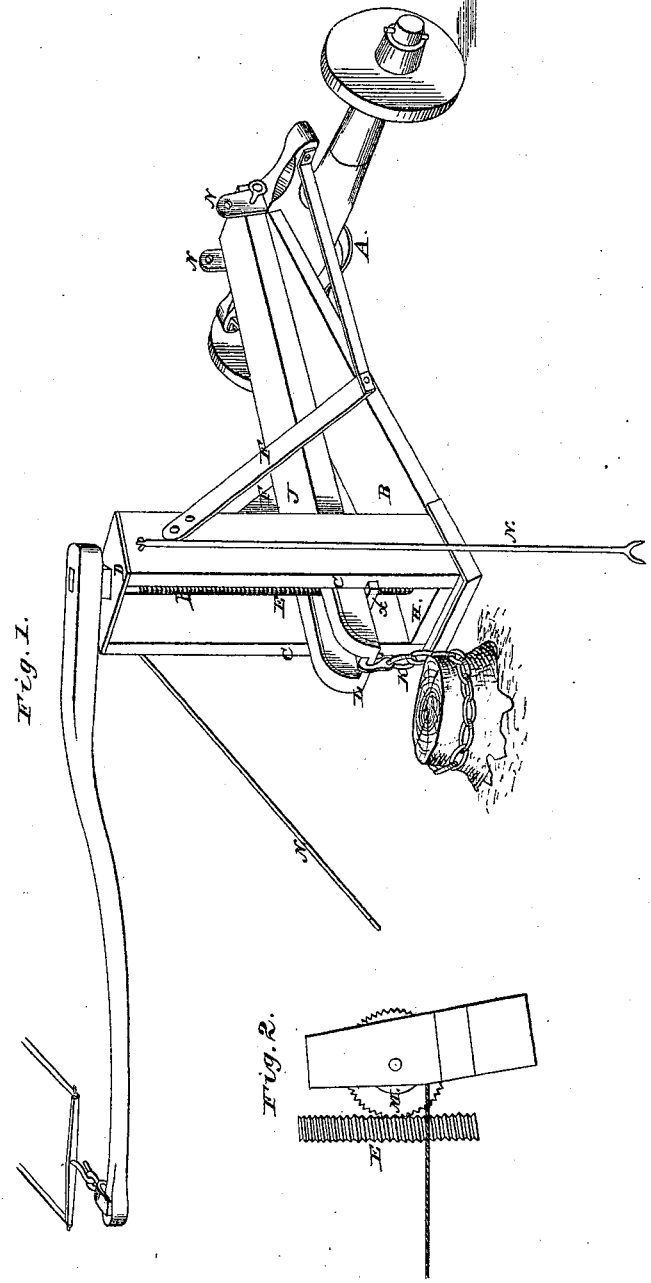

UNITED STATES PATENT OFFICE.

LUKE F. CAVANAUGH, OF NEWFIELD, NEW YORK.

MANNER OF CONSTRUCTING STUMP-EXTRACTORS.

Specification of Letters Patent No. 2,094, dated May 15, 1841.

*To all whom it may concern:*

Be it known that I, LUKE F. CAVANAUGH, of Newfield, in the county of Tompkins and State of New York, have invented a new and useful Machine for Extracting Stumps from and off the Ground and for Removing Buildings and other Heavy Bodies, which is described as follows, reference being had to the annexed drawings of the same, making a part of this specification.

The nature of my invention and improvement consists in arranging a strong screw in a perpendicular position in a suitable frame, to the head of which screw, is attached a sweep, or lever, moved by animal or other power and by which the screw is turned in a horizontal movable nut on which the end of an inclined movable bar rests and to which the chain, made fast to the stump, is attached so that as said nut rises on the screw the end of the bar also rises and the stump is drawn from the ground; said frame being placed on a carriage of four wheels for the purpose of moving it from place to place. One pair of which wheels with the hind axletree being removed so as to bring the end of the frame containing the screw down upon the ground while the other end rests upon the forward axletree in its usual position, and when removing houses substituting a vertical cog wheel for the nut before mentioned into the teeth of which cog wheel, the screw works for turning it, and on the axle of which the chain made fast to the building to be removed is wound as the cog wheel turns and thus draws forward the building, the frame of the moving power being braced by oblique braces set in the ground so as to sustain it firmly.

Figure 1 is a perspective view of the machine. Fig. 2 side view, showing the manner of using the cog wheel M, in place of the nut I.

Similar letters in the figures refer to similar parts.

The carriage A is made in the usual manner. The frame B is composed of a bed piece of timber which connects the front and hind axletrees, and into which timber at the rear end are mortised and tenoned two parallel uprights C united at top by a cap D through which the upper end of the screw E is passed which uprights are braced to the bed timber by oblique braces E and while the machine is in operation by other braces N resting upon the ground. Between the uprights and upon the bed is placed and secured a cast iron step H having an aperture in the center thereof in which the lower end of the screw E turns. The screw E is made of sufficient size and strength and is placed between the uprights before mentioned, the upper end above the cap being square and entering a corresponding square aperture in the sweep. The nut I is made square on the outside with four ears at the corners to keep it in place between the uprights, and is perforated in the center in the usual manner to correspond with the male screw. The movable bar J resting on the nut I and to which the chain K is attached is perforated at one end with an oblong opening to allow it to play over the screw without touching it, and at this end is screwed to it an iron bale L around which the chain made fast to the stump is passed. The other end of said bar J lies loosely upon the bed over the forward axletree between two vertical ears N N through which and the bar a horizontal rod is passed.

In order to operate with this machine the hind axletree and wheels must be removed which will cause the hind end of the bed to descend, and rest upon the ground which must then be brought near the stump so as to bring the bale and chain perpendicularly over the stump and braced in that position, the chain must then be made fast to the stump, the animals must be taken from the tongue and attached to the sweep and driven around in a circle this turns the screw in the step and causes the nut to rise and lift with it the end of the bar, to which the chain is attached and of course draws up the stump from the ground. Another chain attached to the side of the sweep may then be made fast to the stump for drawing it over to one side of the machine.

When removing houses the nut must be removed and the cog wheel M arranged so as to bring its teeth in contact with the thread of the screw, and in this position it is supported by two short standards fastened to the bed and in which the axle of the cog wheel turns. As the screw is turned in the manner before described it turns the cog wheel and the chain attached to the body to be removed being fastened to the axle of the cog wheel is consequently wound upon it which causes the house to move toward the machine the latter being held firmly in one position by the braces.

What I claim as my invention and which I desire to secure by Letters Patent is—

The bed piece B, and movable bar J, in combination with the screw, nut and carriage, constructed and operating as above described.

LUKE F. CAVANAUGH.

Witnesses:
WM. P. ELLIOTT,
F. H. DEWITT.